Jan. 10, 1956    B. COWAN    2,730,118
STOCK METERING AND PROPORTIONING APPARATUS
Filed April 6, 1953    4 Sheets-Sheet 1
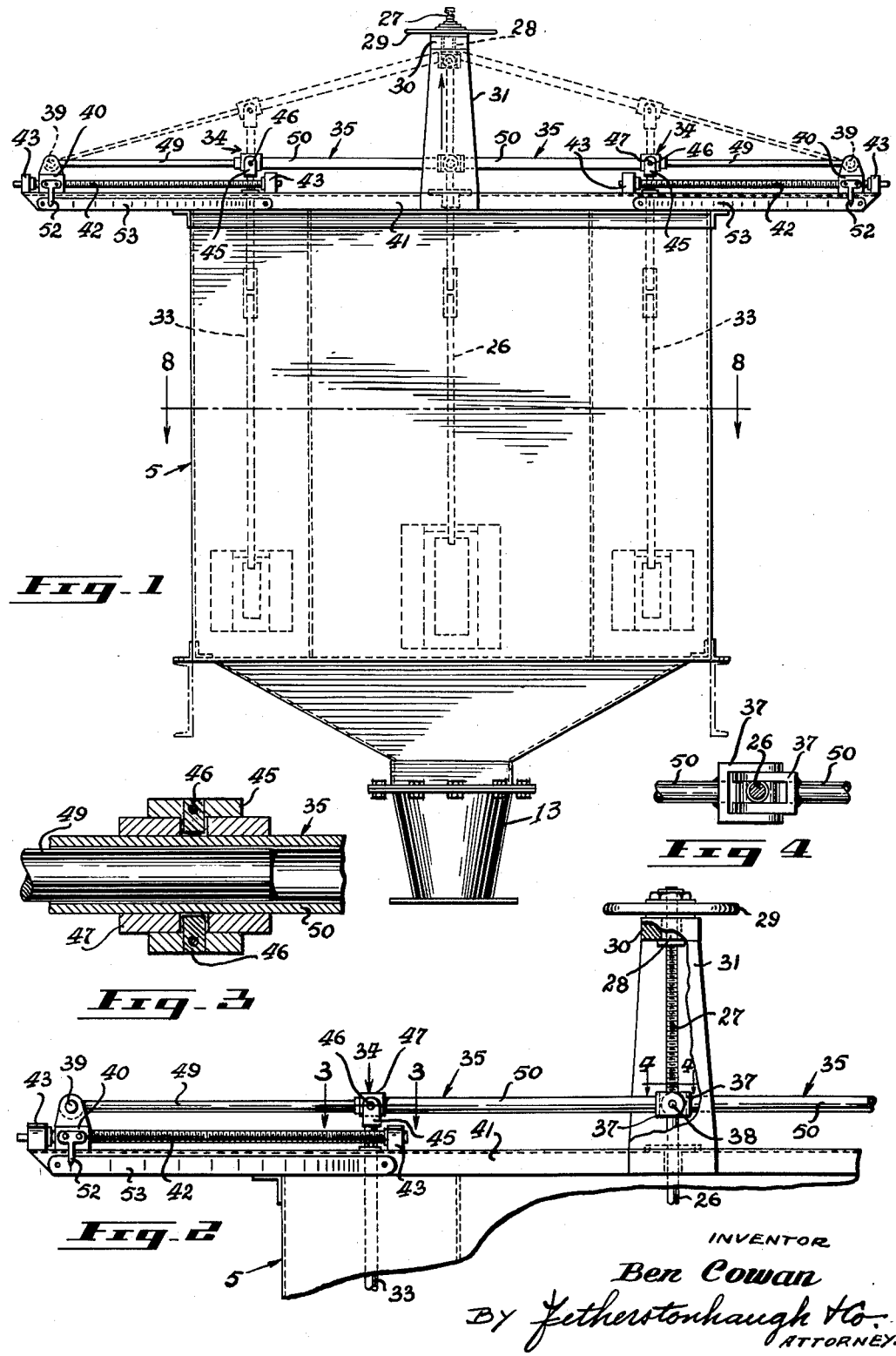
INVENTOR
Ben Cowan
BY Fetherstonhaugh &Co.
ATTORNEYS Jan. 10, 1956      B. COWAN      2,730,118
STOCK METERING AND PROPORTIONING APPARATUS
Filed April 6, 1953      4 Sheets-Sheet 2
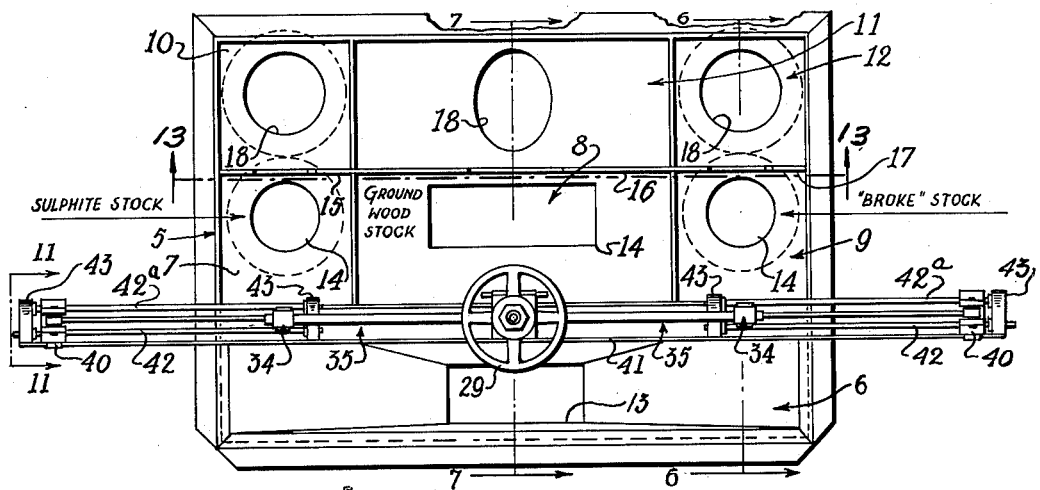
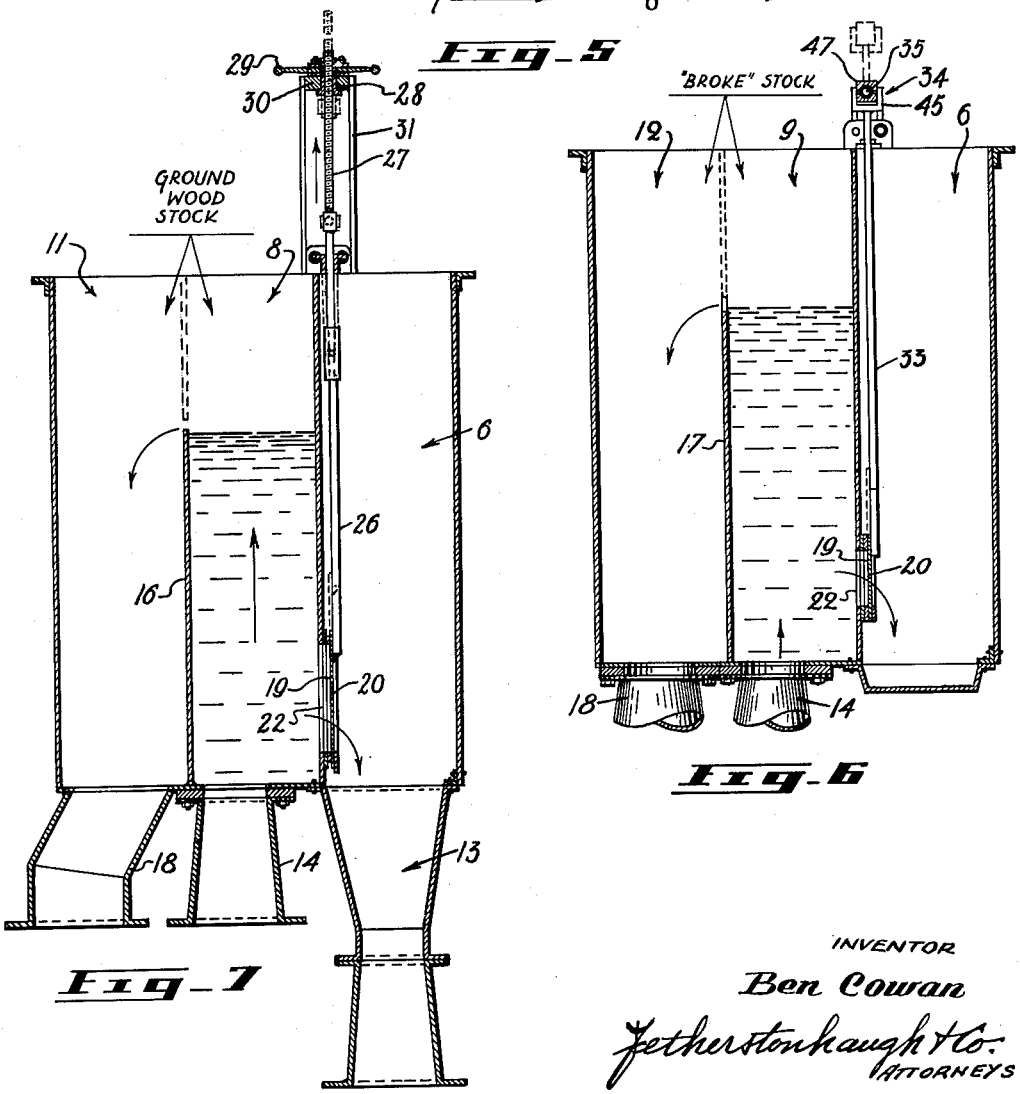
INVENTOR
Ben Cowan
Fetherstonhaugh & Co.
ATTORNEYS Jan. 10, 1956  B. COWAN  2,730,118
STOCK METERING AND PROPORTIONING APPARATUS
Filed April 6, 1953  4 Sheets-Sheet 3
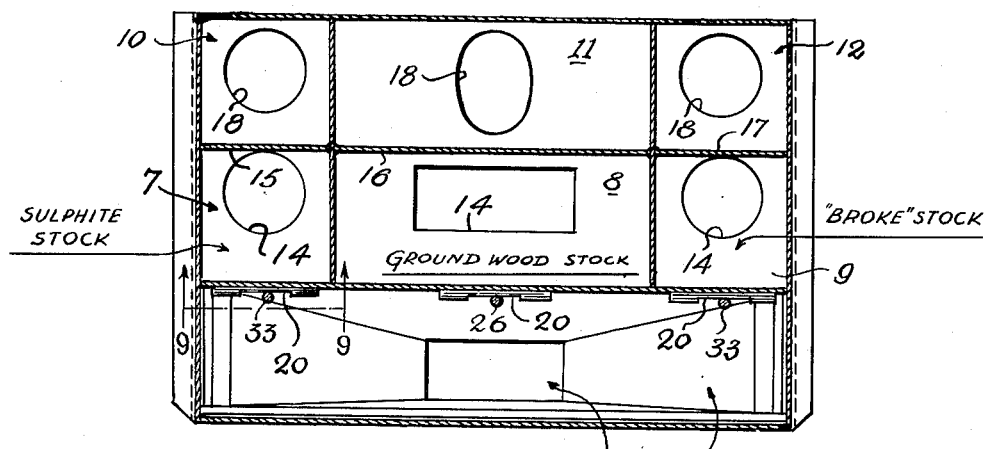
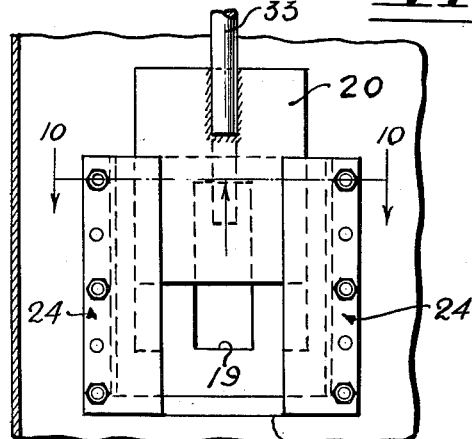
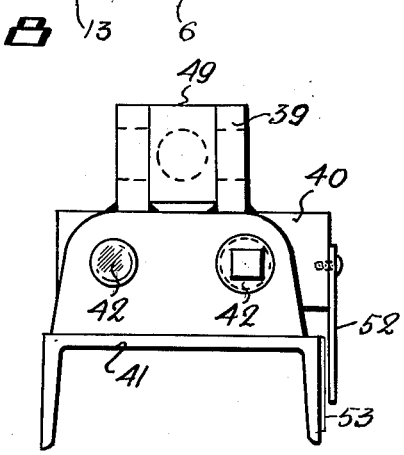
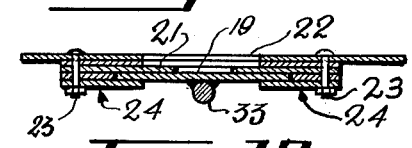
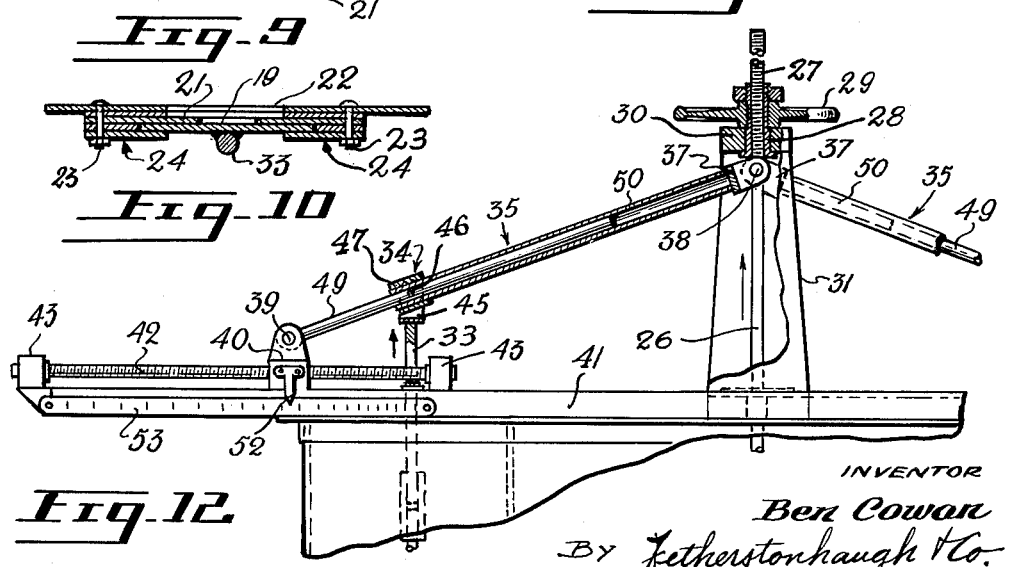
INVENTOR
Ben Cowan
By Fetherstonhaugh & Co.
ATTORNEYS Jan. 10, 1956  B. COWAN  2,730,118
STOCK METERING AND PROPORTIONING APPARATUS
Filed April 6, 1953  4 Sheets-Sheet 4

INVENTOR
*Ben Cowan*
By *Fetherstonhaugh & Co.*
ATTORNEYS

United States Patent Office 2,730,118
Patented Jan. 10, 1956

2,730,118

STOCK METERING AND PROPORTIONING APPARATUS

Ben Cowan, Montreal, Quebec, Canada

Application April 6, 1953, Serial No. 346,890

11 Claims. (Cl. 137—266)

This invention relates to apparatus for metering and proportioning the component ingredients of blended materials and, while capable of wider application, is particularly useful for accurately metering and proportioning different types of pulp stock in preparing a blended "furnish" for the manufacture of paper.

The invention is characterized by certain novel features and combination of features as set forth in the following detailed description of the preferred embodiment shown in the accompanying drawings, in which—

Fig. 1 is an elevational view of a stock metering box assembly embodying the invention.

Fig. 2 is a fragmentary detail view of a metering gate operating mechanism forming part of the assembly shown in Fig. 1.

Figs. 3 and 4 are enlarged detail views of portions of the said metering gate operating mechanism.

Fig. 5 is a top plan view of the assembly shown in Fig. 1.

Fig. 6 is a sectional view taken substantially along the section line 6—6 of Fig. 5.

Fig. 7 is a sectional view taken substantially along the section line 7—7 of Fig. 5.

Fig. 8 is a sectional view taken substantially along the section line 8—8 of Fig. 1.

Fig. 9 is an enlarged detail view of one of the metering gates forming part of the complete assembly shown in Fig. 1.

Fig. 10 is a sectional view taken substantially along the section line 10—10 of Fig. 9.

Fig. 11 is an enlarged end view of a portion of the gate operating mechanism shown in Fig. 2.

Fig. 12 is a view, similar to Fig. 2, but showing the parts in a different position.

Figure 13:
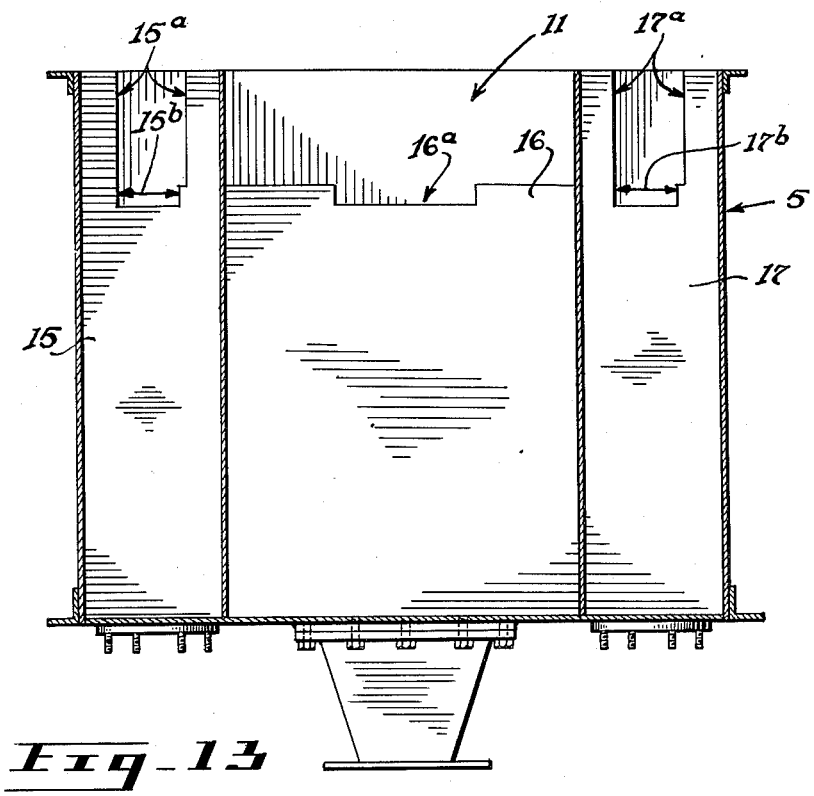
Fig. 13 is a sectional view taken substantially along the section line 13—13 of Fig. 5.

Referring more particularly to the drawings, 5 designates a stock metering and proportioning box designed to effect accurate metering and proportioning of three different types of stock such, for example, as sulphite stock, groundwood stock and "broke" stock.

Box 5 is divided into a plurality of compartments including a front mixing compartment 6, three central stock storage compartments 7, 8 and 9 and three rear overflow compartments 10, 11 and 12.

The front compartment 6 extends the full width of the box and is provided with a bottom stock discharge outlet 13.

A different type of stock is supplied to each of the three central storage compartments 7, 8 and 9 through a stock inlet 14 opening into the bottom of said compartment. For example, and as indicated by legends on the drawings, sulphite stock is supplied to compartment 7, groundwork stock to compartment 8 and "broke" stock to compartment 9.

The rear compartments 10, 11 and 12 serve as overflow compartments for the central stock storage compartments 7, 8 and 9 and are separated from the latter by overflow weirs 15, 16 and 17. Each of the overflow compartments 10, 11 and 12 is provided with a bottom surplus stock discharge outlet 18.

Stock is delivered from each of the storage compartments 7, 8 and 9 to the front compartment 6 through a rectangular metering orifice 19 controlled by a vertically movable metering gate 20. The orifice 19 is preferably formed in an orifice plate 21 (Figs. 9 and 10) which is positioned over a discharge opening 22 provided in the front wall of the storage compartment and is detachably secured to said wall by bolts 23 or other suitable fastening means. This enables the various orifice plates 21 to be readily replaced by similar orifice plates having orifice openings 19 of different predetermined sizes. Each of the metering gates 20 is arranged to slide vertically in suitable guides 24 carried by the associated orifice plate 21.

The metering gate 20 serving the central storage compartment 8 is secured to the lower end of a vertically movable operating rod 26. Rod 26 is formed with an upper screw-threaded portion 27 passing upwardly through a sleeve nut 28 equipped with a hand wheel 29. Sleeve nut 28 is rotatably mounted in the top portion 30 of a pedestal 31 so that it is held against vertical movement. By turning the wheel 29 the rod 26 may be raised and lowered to shift the metering gate 20 of compartment 8 from a fully opened to a fully closed position or to various intermediate positions of adjustment.

Each of the gates 20 serving the stock storage compartments 7 and 9 is secured to the lower end of a vertically movable operating rod 33. The upper end of each rod 33 is slidably and pivotally connected, by connecting means generally indicated at 34, to an intermediate portion of a telescopic lever 35. As here shown the two levers 35 are arranged at opposite sides of the previously mentioned gate operating rod 26 and have their inner ends pivotally secured to said rod by forks 37 and pivot pin 38. The outer ends of said levers are pivotally secured by fulcrum pivots 39 to horizontally shiftable fulcrum blocks 40 arranged to travel along a horizontally disposed supporting channel 41 mounted on the upper portion of box 5. Any suitable means may be provided for shifting each of the blocks 40 to different positions along its horizontal path of travel. In the present instance the means shown for effecting horizontal shifting of each block 40 comprises a horizontally arranged screw 42 which extends through a threaded opening in the block and is rotatably mounted on channel 41 by suitable bearing members 43. Each block 40 is also mounted to slide along a guide rod 42a paralleling the screw 42.

The connection 34 provided between each of the gate operating rods 33 and its associated lever 35 is shown as comprising a fork 45 (Fig. 3) which is carried by the upper end of rod 33 and is pivotally secured, by pivots 46 to a block or slide 47 slidably mounted on lever 35.

As regards the telescopic construction of the levers 35 it will be noted that each lever comprises a solid rod section 49 having its outer end pivoted to the associated fulcrum block 40 by the previously mentioned fulcrum pivot 39 and having its inner end slidably fitted in the outer end portion of a hollow tubular section 50, the latter having its inner end pivoted to the gate operating rod 26 by the previously mentioned fork 37 and pivot pin 38.

The lengths of the gate operating rods 26 and 33 are set and adjusted so that the metering orifices 19 are fully closed by the gates 20 when the levers 35 are in the horizontal position shown in Fig. 1.

Figure 14:
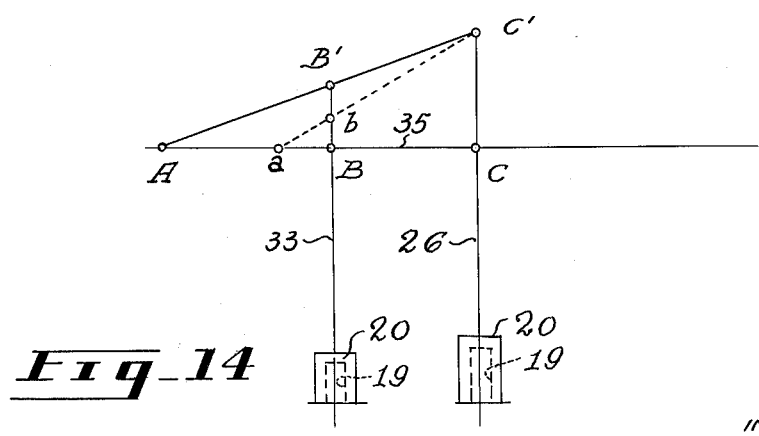
Fig. 14 is a diagram illustrating the operating principle of the invention.

The distance through which the gates 20 of compartments 7 and 9 are caused to travel by movement of levers 35 and gate rods 33 in response to a given travelling movement of the gate operating rod 26 is determined by the positioning of the lever fulcrums 39 and is variable by shifting the fulcrum blocks 40 horizontally to different positions of adjustment through the agency of the adjusting screws 42. In the operation of the metering gates 20 the principle of similar triangles is used to set and to maintain the ratios at which the different types of stocks are delivered from compartments 7, 8 and 9 to compartment 6 through the metering orifices 19. This will be clear from the following description of the diagram shown in Fig. 14.

Consider the lever 35 (Fig. 14) to lie in the horizontal positions ABC, with the gates 20 fully closed, with the point A representing the fulcrum of the lever, the point B representing the connection between the lever and the gate operating rod 33 and the point C representing the connection between the lever and the gate operating rod 26. Let C now move vertically to $C^1$ whence B moves to $B^1$. The ratio of movement $= BB^1/CC^1 = AB/AC$. Thus, the total quantity of discharge through the orifices 19 can be varied by moving point C, vertically and the ratio of the openings of the orifices, always the same, i. e. $= AB/AC =$ constant for any given setting. If point A is now shifted to position $a$, point B will move to position $b$ in response to movement of C to C'. In this case the ratio of movement and, consequently, the ratio of the orifice areas is changed to $aB/aC$. The operation of the unit is then as follows.

The different types of stock are fed to the compartments 7, 8 and 9 so as to maintain a constant head on the orifices 19 with the surplus overflowing the weirs 15, 16 and 17 into the overflow compartments 10, 11 and 12. The total effective opening of the orifices 19 and the total quantity of stock discharged through each orifice is governed by moving the gate operating rod 26 vertically through the agency of the sleeve nut 28 and hand wheel 29. The proportions in which the different types of stock are delivered to the compartment 6 through the metering orifices 19 is changed by horizontal adjustment of the fulcrum blocks 40 to which the outer ends of the telescopic levers 35 are connected by the fulcrum pivots 39.

In order to facilitate accurate duplication of any setting of the lever fulcrum blocks 40 the latter are provided with pointers 52 arranged to travel over horizontally extending calibrated scales 53 carried by the previously mentioned channel member 41.

It is important that, for any position of the gates 20, the head of stock maintained on the orifices 19 be substantially constant and uniform within close limits for all of said orifices. This is accomplished by regulating the feed of stock to the storage compartments 7, 8 and 9 and by appropriate design of the overflow weirs 15, 16 and 17. On referring to Fig. 13, it will be noted that the upper edge of weir 16 is located a substantial distance below the upper edges of the remaining vertical walls of compartments 8 and 11 and is provided with a central overflow notch 16a of predetermined depth and length. It will also be noted that the weirs 15 and 17 are of the same height as the remaining walls of the compartments of which they form a part and are provided with centrally located overflow slots extending downwardly from their upper edges as indicated at 15a and 17a respectively. The bottom horizontal boundary walls of the overflow slots 15a and 17a are coplanar with the bottom horizontal boundary wall of the overflow notch 16a and the lower positions of said slots are narrowed to provide constricted portions 16b and 17b which are of predetermined length and of the same depth as the overflow notch 16a.

The amount of stock delivered to compartments 7, 8 and 9 is regulated so that, with the gates 20 wide open, the overflow from these compartments will just fill the notch 16a of weir 16 and the lower restricted portions 15b and 17b of the slots 15a and 17a of weirs 15 and 17. When the gates are fully closed or shifted to a position between the wide open and the fully closed position the surplus stock will, due to the design of the weirs 15, 16 and 17, rise substantially at the same rate in all of the compartments 7, 8 and 9 to maintain a substantially uniform head on all of the orifices 19.

The rectangular shape of the metering orifices 19 and gates 20 is also important in that this shaping of the orifices and gates gives more accurate metering results than can be obtained with other shapes.

The term "stock," employed in the appended claims, is used in a generic sense to include suspensions of solids in liquids, solutions and other fluent materials, to the metering and proportioning of which the invention is applicable.

Having thus described the nature of my invention and a preferred embodiment it will be understood that various modifications are contemplated as falling within the scope and spirit of the invention as defined by the appended claims.

What I claim is:

1. Stock metering and proportioning apparatus comprising a mixing compartment, a plurality of stock storage compartments to which different types of stock are supplied and from which said stocks are delivered to said mixing compartment in predetermined amounts and proportions, each of said stock storage compartments being provided with overflow means and with stock inlet and outlet orifices located below the level of overflow, stock metering and proportioning gates controlling said outlet orifices, and operable to vary both the total quantity of stock discharged through each outlet orifice and the proportions in which the different types of stocks are delivered through said orifices to said mixing compartment, gate operating means interconnecting said gates and operable to shift the latter to various positions to vary the total effective opening of said discharge orifices, said gate operating means being adjustable to vary the ratios of movement of the several gates in response to a given operation of said gate operating means to thereby vary the ratios at which the different types of stock are delivered from the storage compartments to the mixing compartment, and means for supplying stock to said stock storage compartment to maintain a continuous overflow therefrom.

2. Stock metering and proportioning apparatus as set forth in claim 1, in which the ratio of supply of stock to said storage compartments and the overflow of excess stock from said storage compartments are predetermined to maintain a substantially uniform head of stock on all of said discharge orifices for any given position of said gates.

3. Stock metering and proportioning apparatus as set forth in claim 1, in which said gate operating means includes a reciprocable gate actuating rod connected to each gate, manually controllable means for effecting lineal gate operating movement of one of said rods, and means connecting said manually controllable gate operating rod to each of the other gate operating rods including a telescopic lever having one end pivotally secured to said manually controllable gate operating rod and having an intermediate portion thereof operatively connected to said other gate operating rod, a slide to which the other end of said telescopic lever is connected by a fulcrum pivot, and means for moving said slide to different positions of adjustment to thereby vary the proportions in which the different types of stock are delivered to said mixing compartment through the orifices controlled by said gates.

4. Stock metering and proportioning apparatus as set forth in claim 1, in which said gate operating means includes a reciprocable gate actuating rod connected to each gate, manually controllable means for effecting lineal gate operating movement of one of said rods, and means connecting said manually controllable gate operating rod to each of the other gate operating rods including a telescopic lever having one end pivotally secured to said manually controllable gate operating rod and having an intermediate portion thereof operatively connected to said other gate operating rod, a slide to which the other end of said telescopic lever is connected by a fulcrum pivot, means for moving said slide to different positions of adjustment to thereby vary the proportions in which the different types of stock are delivered to said mixing compartment through the orifices controlled by said gates, and a horizontal supporting member along which said slides are mounted to travel, the said means for moving said slides comprising operating screws mounted on said supporting member and passing through threaded openings formed in said slides.

5. Stock metering and proportioning apparatus as set forth in claim 1, in which said gate operating means includes a reciprocable gate actuating rod connected to each gate, manually controllable means for effecting lineal gate operating movement of one of said rods, and means connecting said manually controllable gate operating rod to each of the other gate operating rods including a telescopic lever having one end pivotally secured to said manually controllable gate operating rod and having an intermediate portion thereof operatively connected to said other gate operating rod, a slide to which the other end of said telescopic lever is connected by a fulcrum pivot, means for moving said slide to different positions of adjustment to thereby vary the proportions in which the different types of stock are delivered to said mixing compartment through the orifices controlled by said gates, said stock metering and proportioning apparatus being further characterized in that the lengths of the gate actuating rods are set and adjusted so that all the discharge orifices of the stock storage compartments are fully closed by their respective gates when the said lever or levers are in a horizontal position.

6. Stock metering and proportioning apparatus as set forth in claim 1, in which the overflow means are designed so that, for any given position of said gates, the stock will rise substantially at the same rate in all of said storage compartments to maintain a substantially uniform head of stock in all of said stock storage compartments.

7. Stock metering and proportioning apparatus as set forth in claim 1, in which the stock storage compartments and their discharge orifices vary in size and in which the overflow means associated with said compartments is designed so that, for any given position of said gates, the stock will rise substantially at the same rate in all of said storage compartments to maintain a substantially uniform head of stock on all of said discharge orifices.

8. Stock metering and proportioning apparatus as set forth in claim 1, in which the discharge orifices of the stock storage compartments and the gates controlling said orifices are of rectangular configuration.

9. Stock metering and proportioning apparatus as set forth in claim 1, in which the stock discharge orifice of each stock storage compartment is formed in an orifice plate detachably secured to a wall of the stock storage compartment over a discharge opening in said wall, each of said orifice plates being provided with guides in which the gate controlling the orifice of said plate is slidably mounted.

10. Stock metering and proportioning apparatus of the character described, comprising a box provided with walls defining a mixing chamber extending across the full width of the front of the box and provided with a bottom stock discharge orifice, a plurality of stock storage chambers arranged behind and separated from said mixing chamber by wall members provided, in the lower portion thereof, with stock discharge orifices through which stock is delivered to said mixing chamber from said storage chambers and an overflow compartment arranged behind each of said storage compartments and separated therefrom by an overflow weir provided with a notch of predetermined dimensions extending downwardly from the upper edge of the weir, each of said stock storage compartments being provided with a bottom stock inlet and each of said overflow compartments being provided with a bottom outlet, gates controlling the stock discharge orifices through which stock is delivered from said storage compartments of said mixing compartment, said gates being operable to vary both the total quantity of stock discharged through each of said storage discharge orifices and the proportion in which the stocks contained in said storage compartments are delivered to said mixing compartment, means for supplying a different type of stock to each of said storage compartments to maintain a continuous overflow therefrom into the associated overflow compartment and gate operating means interconnecting said gates and operable to shift said gates to various positions to control the total effective opening of the stock discharge orifices through which the different types of stock are delivered to said mixing chamber, said gate operating means being adjustable to vary the ratio of movement of the several gates in response to a given operation of said gate operating means to thereby vary the ratios at which the different types of stock are delivered from the storage compartments to the mixing compartment, the rate at which stock is supplied to said storage compartments and the dimensions of the overflow weirs and the slots provided therein being predetermined so that, for any position of said gates, the stock will rise substantially at the same rate to maintain a substantially uniform head of stock on all of said stock discharge orifices through which stock is delivered to said mixing compartment.

11. Stock metering and proportioning apparatus as set forth in claim 3, including means for facilitating accurate duplicate setting of said slides, said means comprising a horizontal supporting member along which the slides are mounted to travel, calibrated scales carried by said supporting member and pointers carried by said slides and arranged to travel over said scales.

No references cited.